H. KELLOGG.
Wheels for Vehicles.

No. 134,894.

Patented Jan. 14, 1873.

Witnesses:
John Becker.
C. Sedgwick.

Inventor:
H. Kellogg
per
Attorneys.

AM. PHOTO-LITHOGRAPHIC CO. N.Y.(OSBORNE'S PROCESS.)

UNITED STATES PATENT OFFICE.

HIRAM KELLOGG, OF FLOYD, IOWA.

IMPROVEMENT IN WHEELS FOR VEHICLES.

Specification forming part of Letters Patent No. 134,894, dated January 14, 1873.

*To all whom it may concern:*

Figure 1:
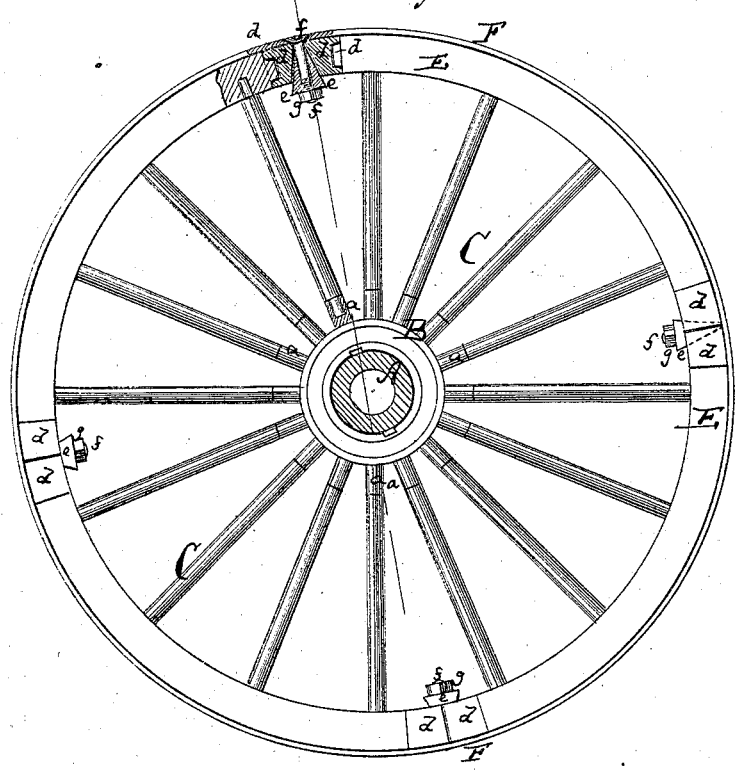
Figure 2:
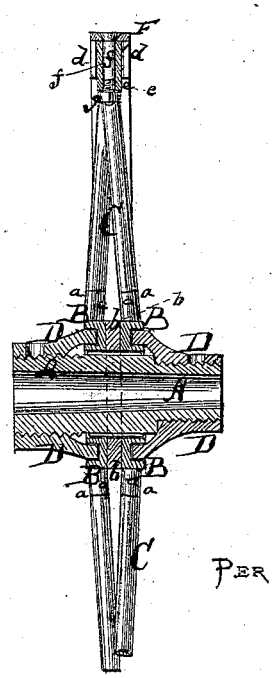

Be it known that I, HIRAM KELLOGG, of Floyd, in the county of Floyd and State of Iowa, have invented a new and Improved Wheel for Vehicles, of which the following is a specification:

Figure 1 represents a face view partly in section of my improved wheel for vehicles. Fig. 2 is a vertical transverse section of the same.

Similar letters of reference indicate corresponding parts.

The invention consists in securing the inner ends of the spokes in tubular projections of rings that are adjustable on the hub, so that said rings can be set closer together on the hub the more the felly is expanded, and the spokes placed more in line with the rim, to be adapted to the larger diameter of the wheel.

A in the drawing represents the hub of the wheel, of tubular form. B B are two rings of metal embracing the hub and containing tubular projections $a$ $a$, into which the inner ends of the spokes C C are inserted. Rings or caps D D, which are screwed upon the ends of the hub, serve to set the rings B B more or less together against an annular plate or washer, $b$, between them. The more the rings B B are apart the more will the spokes be inclined, and the smaller the diameter of the wheel. If the diameter of the rim is increased the rings B B should be set further apart to bring the spokes more in line with the rim. E is the felly of the wheel, and F the tire. Between the sections of the felly, whose ends are capped with metal blocks $d$ $d$, are inserted metallic wedges $e$ $e$. Through each of these wedges is fitted a bolt, $f$, whose head is supported in the tire, as is clearly shown in the upper part of Fig. 1. The more the nut $g$ on the lower end of the bolt $f$ should be turned to approach the tire the more will the wedge $e$ be forced into the felly to expand the same. Thus, if, as often happens, the felly should contract within the tire it can be easily expanded to fill the tire and restore the stability of the wheel.

Having thus described my invention, I claim as new and desire to secure by Letters Patent—

The means described for changing the position of spokes to suit any contraction or expansion in the fellies, consisting of the adjustable caps D and rings B $a$ applied on the hub A, as set forth.

HIRAM KELLOGG.

Witnesses:
EBENEZER H. MORRISON,
JOHN W. WEBSTER.